(12) United States Patent
Jan et al.

(10) Patent No.: US 11,645,437 B2
(45) Date of Patent: May 9, 2023

(54) VIRTUAL DEBRIS SIMULATOR FOR ANALYZING DEBRIS CLOGGING AREAS AND WASHING CYCLE OF A MACHINED OBJECT

(71) Applicant: Ford Global Technologies, LLC, Dearborn, MI (US)

(72) Inventors: Yi-Jou Jan, Canton, MI (US); Aaron Khorran, Livonia, MI (US); Mark Hall, Livonia, MI (US); Carlos Silva, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 16/886,277

(22) Filed: May 28, 2020

(65) Prior Publication Data

US 2021/0374312 A1    Dec. 2, 2021

(51) Int. Cl.
*G06F 30/25* (2020.01)
*G06F 30/28* (2020.01)

(52) U.S. Cl.
CPC .............. *G06F 30/25* (2020.01); *G06F 30/28* (2020.01)

(58) Field of Classification Search
CPC ...... G06F 30/25; G06F 30/28; G06F 2113/08; G06F 30/20; G06F 30/23
See application file for complete search history.

(56) References Cited

U.S. PATENT DOCUMENTS

| 9,776,220 B2 | 10/2017 | Noda et al. |
| 10,279,448 B2 | 5/2019 | Nakayama |

FOREIGN PATENT DOCUMENTS

| CN | 105512400 | 4/2016 |
| JP | H06297292 | 10/1994 |

OTHER PUBLICATIONS

Yu Liu, et al., "A Simulation Study of Debris Removal Process in Ultrasonic Vibration Assisted Electrical Discharge Machining (EDM) of Deep Holes," Micromachines 9 pp. 1-22 (Year: 2018).*
C.T. Wu, et al., "Numerical and experimental validation of a particle Galerkin method for metal grinding simulation," Comput Mech 61:365-383 (Year: 2018).*
Wenchao Zhang, et al., "Research on the Gap Flow Simulation of Debris Removal Process for Small Hole EDM Machining with Ti Alloy," 4th International Conference on Mechatronics, Materials, Chemistry and Computer Engineering, pp. 1-6 (Year: 2015).*

* cited by examiner

*Primary Examiner* — Steven W Crabb
(74) *Attorney, Agent, or Firm* — Burris Law, PLLC

(57) ABSTRACT

A method to identify possible debris clogging area in a machined object includes simulating movement of a plurality of debris particles provided within a modeled object having a plurality of cavities in accordance with a debris clogging evaluation to identify inaccessible areas along the plurality of cavities. The plurality of debris particles is indicative of solid debris and the modeled object is a multidimensional computer designed model. The method further includes determining an egress characteristic of the plurality of cavities based on the simulated movement of the plurality of debris particles. The egress characteristic includes a contact area, an obstruction area, or a combination thereof.

16 Claims, 13 Drawing Sheets

VIRTUAL DEBRIS SIMULATOR FOR ANALYZING DEBRIS CLOGGING AREAS AND WASHING CYCLE OF A MACHINED OBJECT

FIELD

The present disclosure relates to cleaning manufactured objects and more particularly, to remove debris generated during a machining operation to from the object.

BACKGROUND

The statements in this section merely provide background information related to the present disclosure and may not constitute prior art.

In manufacturing high precision metal part, such as engine components, machining operations of workpieces (e.g., cast parts) are typically employed. However, unlike additive manufacturing, machining operations can generate a significant amount of chips or in other words, debris that is typically removed via a washing cycle before a final assembly operation.

In some instances, debris may remain within the component even after the washing cycle and thus, may transfer to the final assembled system such as the engine. Debris trapped within the component can fall off and interfere with the assembly process such as an engine assembly process, or conversely, debris may flow through the assembled system and can cause system complications or abnormal operations. These issues with residual debris in machined components, among other issues with the manufacturing process of high precision components, are addressed by the present disclosure.

SUMMARY

This section provides a general summary of the disclosure and is not a comprehensive disclosure of its full scope or all of its features.

In one form, the present disclosure is directed toward a method that includes simulating movement of a plurality of debris particles provided within a modeled object having a plurality of cavities in accordance with a debris clogging evaluation to identify inaccessible areas along the plurality of cavities. The plurality of debris particles is indicative of solid debris and the modeled object is a multidimensional computer designed model. The method further includes determining an egress characteristic of the plurality of cavities based on the simulated movement of the plurality of debris particles, where the egress characteristic includes a contact area, an obstruction area, or a combination thereof.

In another form, the method further includes calculating a debris passing index, a debris clogging area, or a combination thereof based on the egress characteristic of the plurality of cavities. The debris passing index is a ratio of the contact area versus a total area of the modeled object and the debris clogging area is an area provided along the plurality of cavities that is inaccessible by the plurality of debris particles.

In yet another form, the method further includes defining an object cleansing procedure, an object manufacturing procedure, or a combination thereof based on the egress characteristic.

In one form, the method further includes identifying, as the contact area, an area along the plurality of cavities at which one or more debris particles from among the plurality of debris particles flows through, and identifying, as the obstruction area, an area along the plurality of cavities that is inaccessible by the plurality of debris particles.

In another form, the debris clogging evaluation includes a fill-shake evaluation, and for the fill-shake evaluation, the method further includes simulating the modeled object in a filled state in which the plurality of debris particles is distributed throughout the plurality of cavities, and rotating the modeled object about an axis to assess movement of the plurality of debris particles through the modeled object.

In yet another form, the debris clogging evaluation is an inject-overflow evaluation, and for the inject-overflow evaluation, the method further includes simulating injection of the plurality of debris particles at a first opening of the modeled object until the plurality of debris particles exits a second opening different from the first opening.

In one form, the debris clogging evaluation includes an inject-shake evaluation, and for the inject-shake evaluation, the method further includes simulating injection of the plurality of debris particles at an opening of the modeled object to meet a fill criterion, and rotating the modeled object about an axis to assess movement of the plurality of debris particles through the modeled object. In one variation, the fill criterion is at least one of predetermined time period and a predefined volume.

In another form, simulating movement of the plurality of debris particles is based on smoothed-particle hydrodynamic.

In yet another form, the method further includes simulating a washing cycle of the modeled object in which a plurality of liquid particles flow through the plurality of cavities, wherein the liquid particles are indicative of a liquid substance; and determining a cleansing characteristic of the modeled object, where the cleansing characteristic includes a wet area, a cleansing time, or a combination thereof. In one variation, the method further includes determining a cleansing efficiency to provide an amount of the wet area over time, an accumulated soaking index to provide a cleansing time for the modeled object, or a combination thereof based on the cleansing characteristic, wherein the cleansing efficiency is based on the wet area. In yet another variation, a debris particle from among the plurality of debris particles has a defined particle size that is greater than that of a liquid particle from among the plurality of liquid particles.

In one form, the present disclosure is directed toward a method that includes executing a virtual debris clogging evaluation of a modeled object having a plurality of cavities to identify a potential debris clogging area of the modeled object. The virtual debris clogging evaluation includes a simulation of a plurality of particles moving through the modeled object, and for the virtual debris clogging evaluation, the plurality of particles is defined at a first size. The method further includes predicting an egress characteristic of a physical object configured as the modeled object having the plurality of cavities based on the executed virtual debris clogging evaluation.

In another form, the method further includes executing a virtual washing cycle evaluation of the modeled object to identify a cleansing characteristic of the modeled object. The virtual washing cycle evaluation is a simulation of the plurality of particles flowing through the modeled object, and for the virtual washing cycle evaluation, the plurality of particles is defined at a second size less than the first size. The method further includes defining a washing cycle for the physical object based on the virtual washing cycle evaluation of the modeled object. In one variation, the virtual debris clogging evaluation and the virtual washing cycle evaluation are based on smoothed-particle hydrodynamic. In another variation for the virtual debris clogging evaluation, the plurality of particles is indicative of solid debris and for the virtual washing cycle evaluation, the plurality of particles is indicative of liquid.

In one form, the present disclosure is directed toward a non-transitory computer readable medium storing program instructions, that when executed by a processor of computing device, cause the computing device to perform a set of operations including simulating movement of a plurality of debris particles provided within a modeled object having a plurality of cavities in accordance with a debris clogging evaluation to identify inaccessible areas along the plurality of cavities and determining an egress characteristic of the plurality of cavities based on the simulated movement of the plurality of debris particles. The plurality of debris particles is indicative of solid debris, the modeled object is a multi-dimensional computer designed model, and the egress characteristic includes a contact area, an obstruction area, or a combination thereof.

In another form, the set of operations further includes simulating a washing cycle of the modeled object in which a plurality of liquid particles flow through the plurality of cavities and determining a cleansing characteristic of the modeled object. The liquid particles are indicative of a liquid substance and the cleansing characteristic includes a wet area, a cleansing time, or a combination thereof. In one variation, the set of operations further includes determining a cleansing efficiency to provide an amount of the wet area over time, an accumulated soaking index to provide a cleansing time for the modeled object, or a combination thereof based on the cleansing characteristic. The cleansing efficiency is based on the wet area.

In yet another form, the set of operations further includes calculating a debris passing index, a debris clogging area, or a combination thereof based on the egress characteristic of the plurality of cavities. The debris passing index is a ratio of the contact area versus a total area of the modeled object and the debris clogging area is an area provided along the plurality of cavities that is inaccessible by the plurality of debris particles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
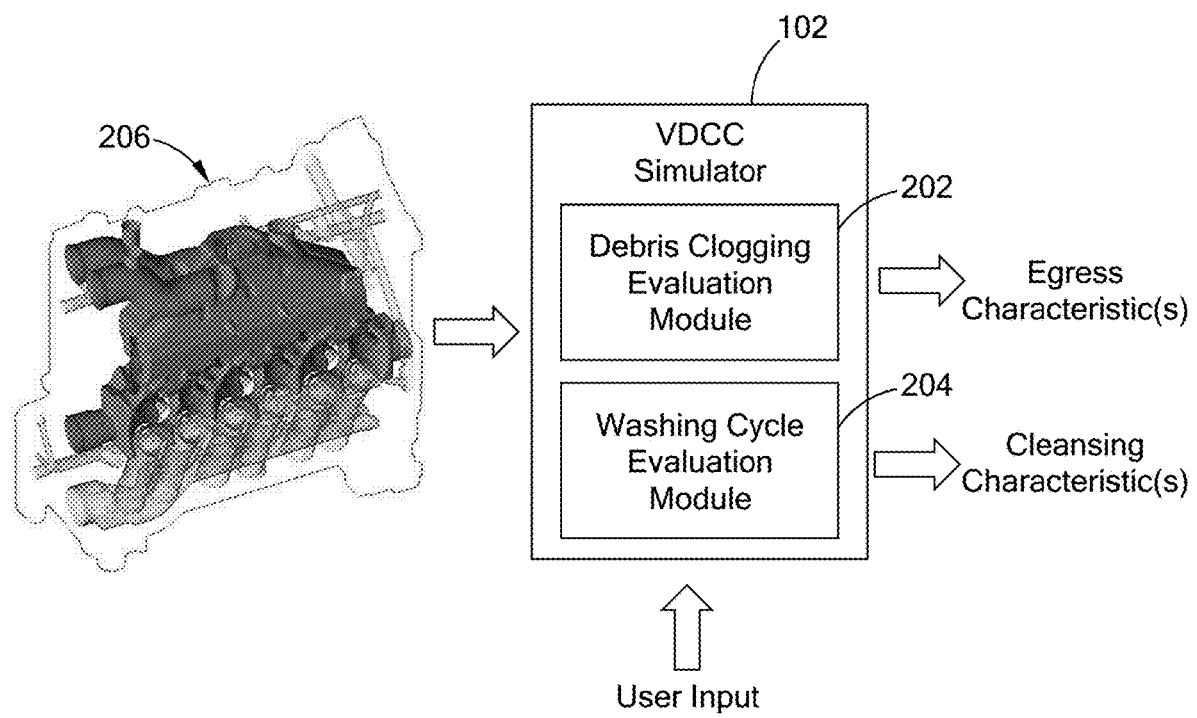
FIG. 2 is a block diagram of the VDCC simulator of FIG. 1.
Figure 4A:
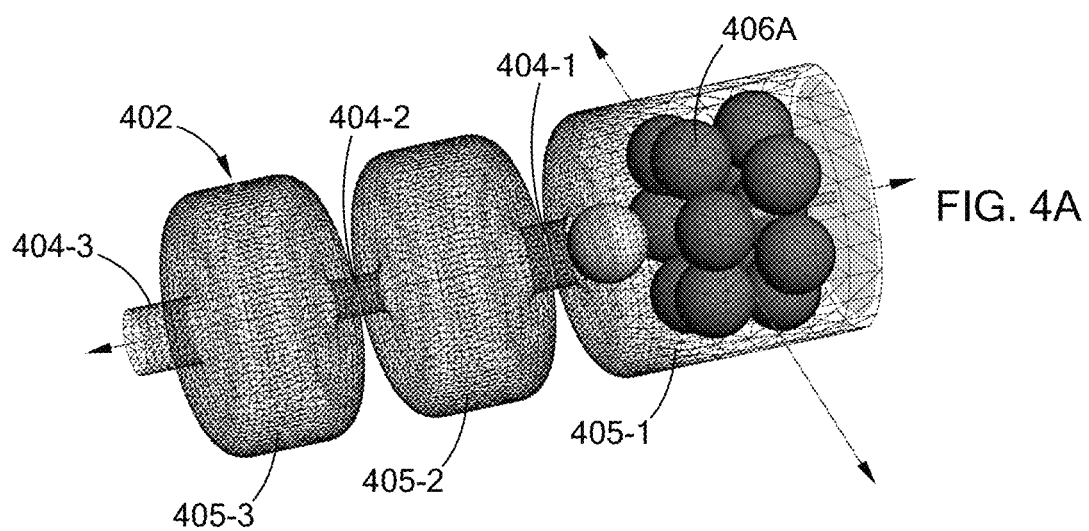
Figure 4B:
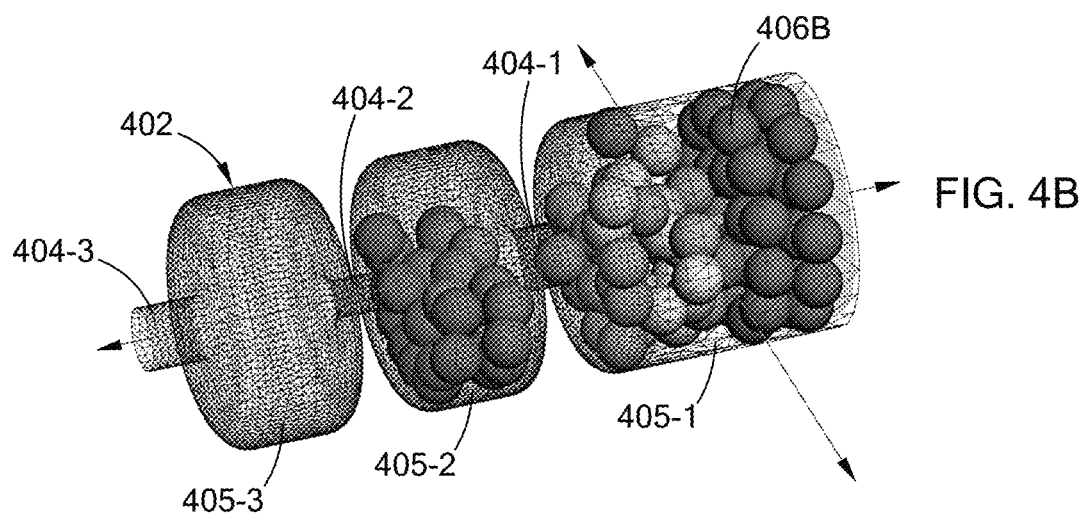
Figure 4C:
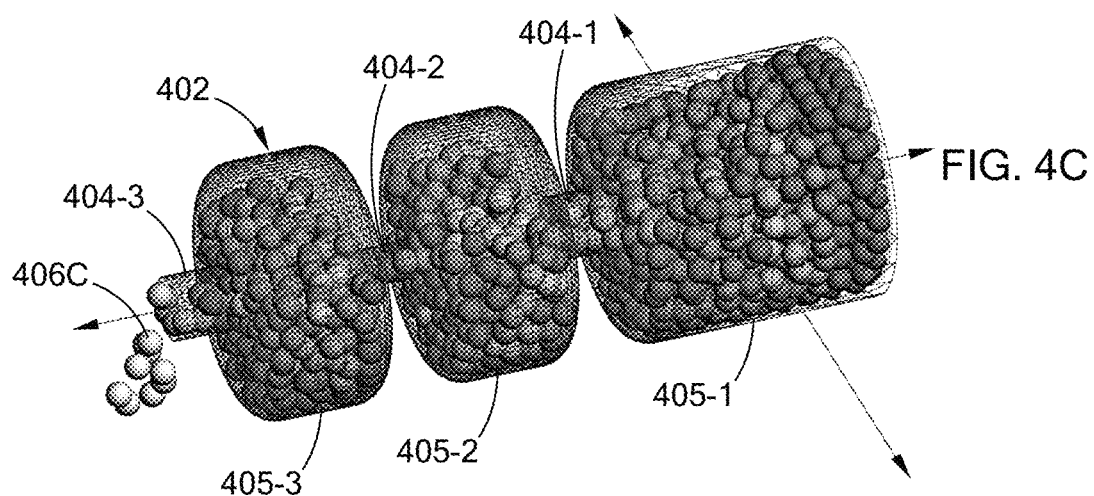
Figure 5A:
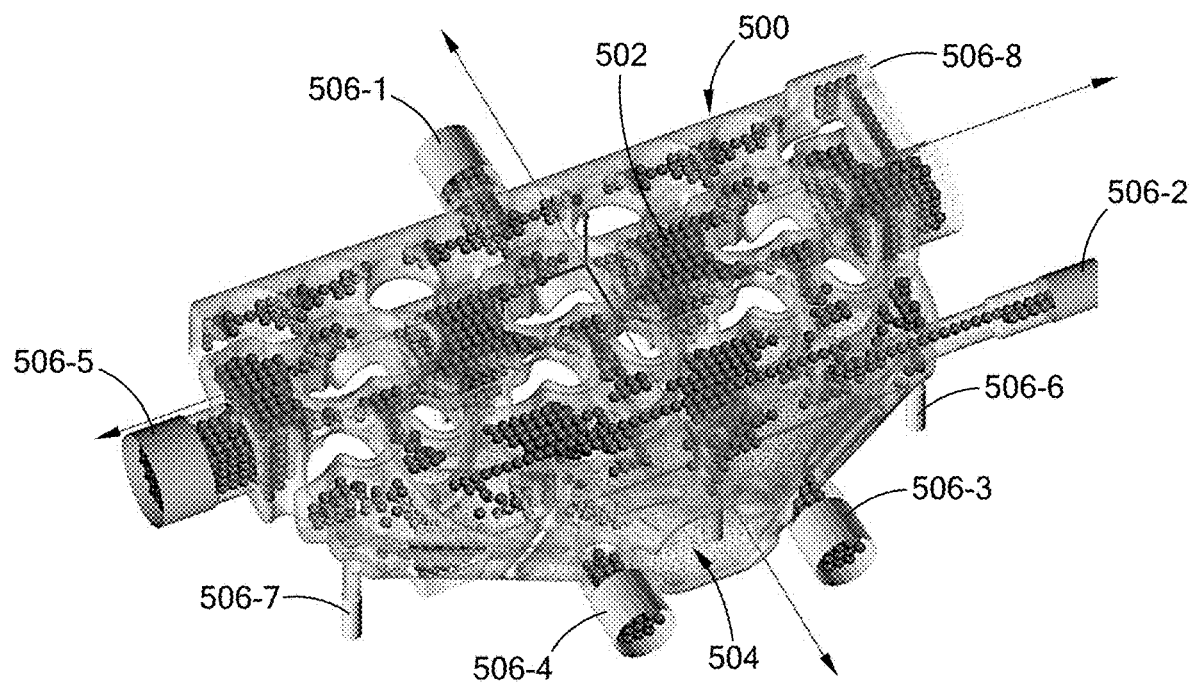
Figure 5B:
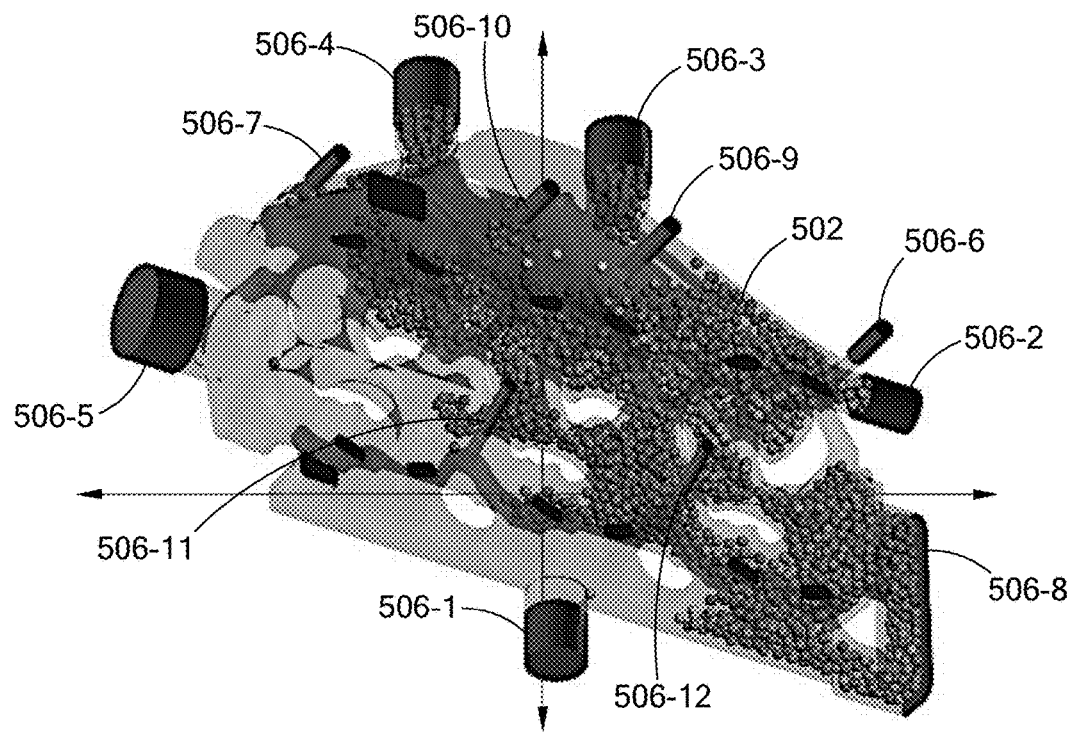
Figure 5C:
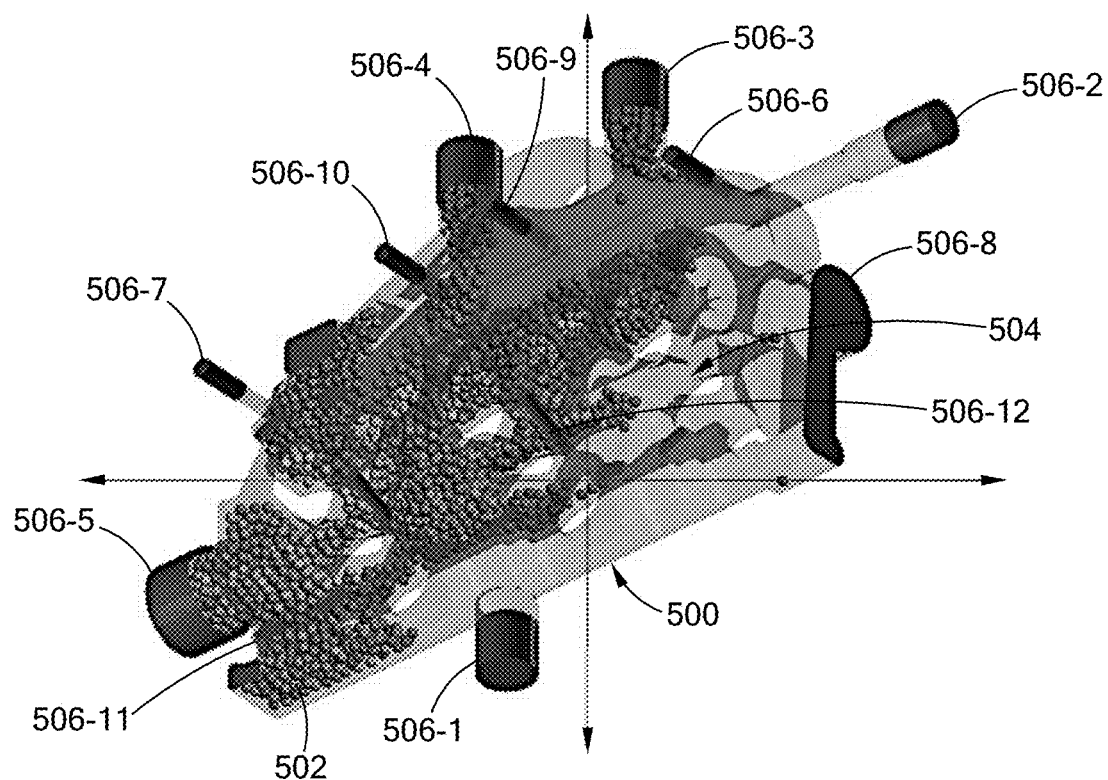
Figure 6A:
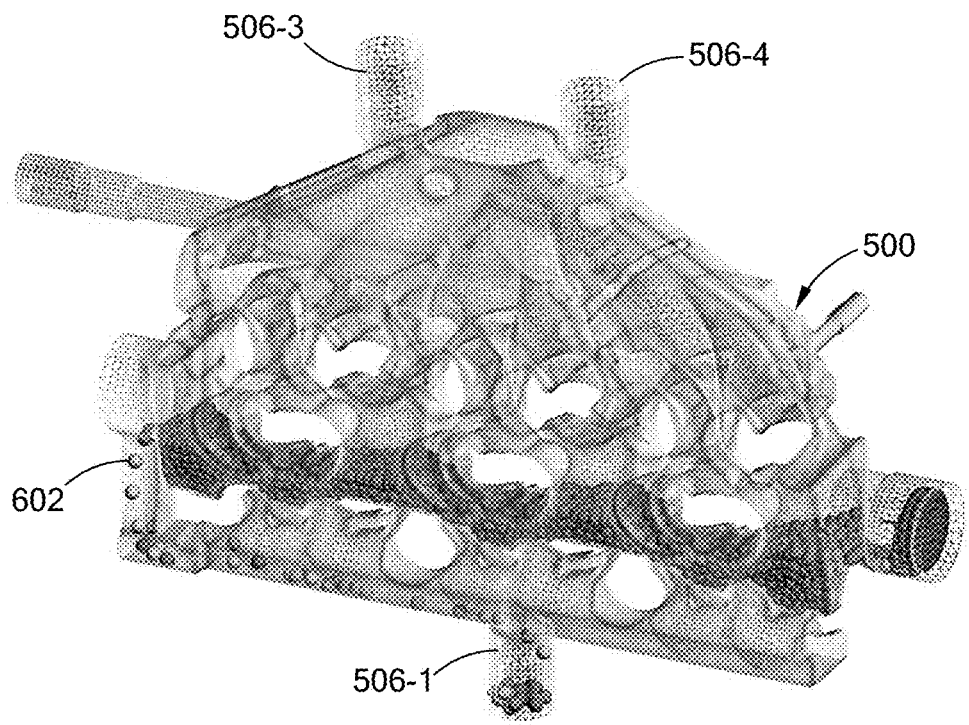
Figure 6B:
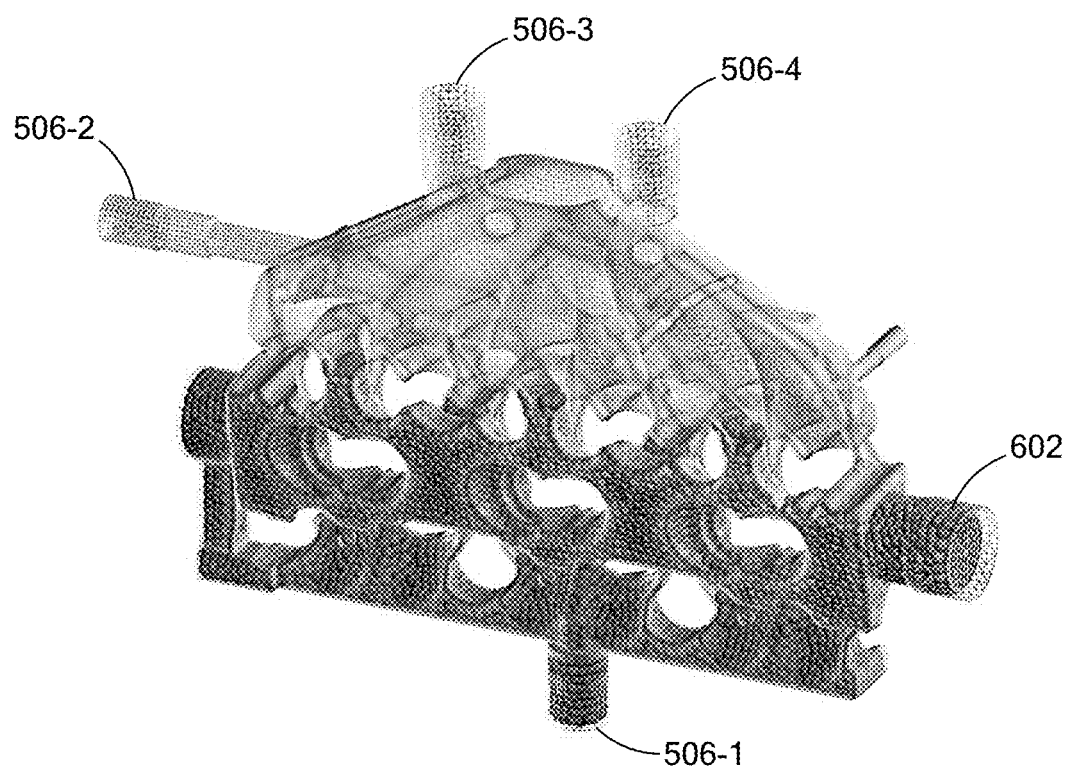
Figure 6C:
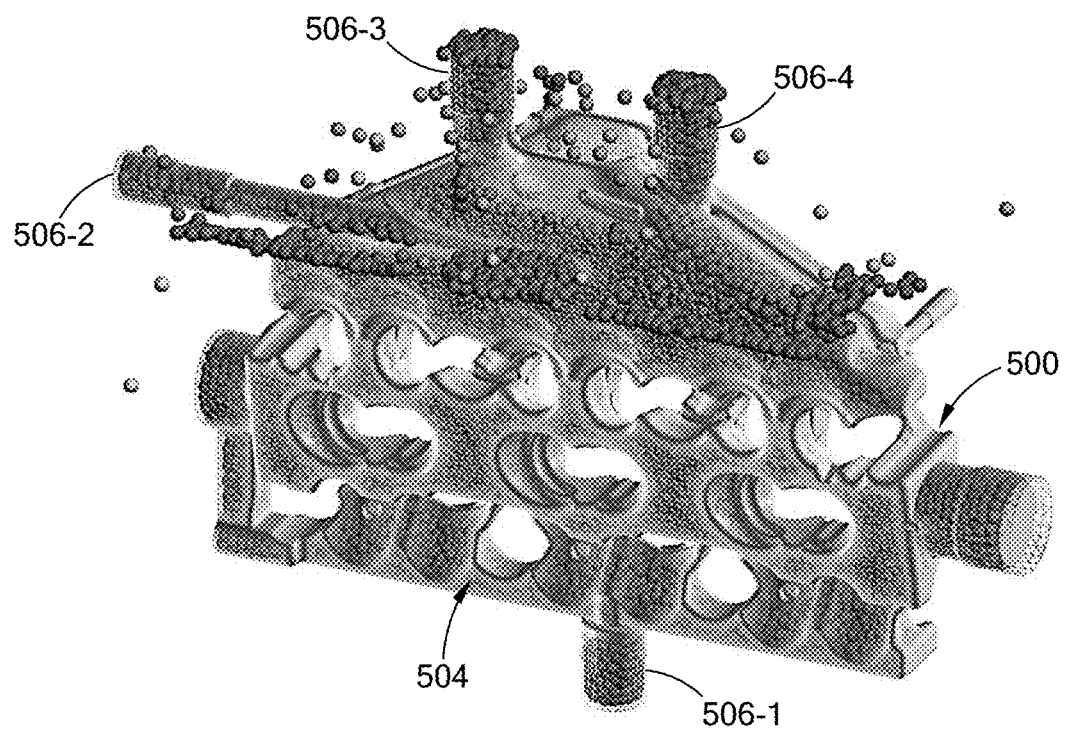
Figure 7A:
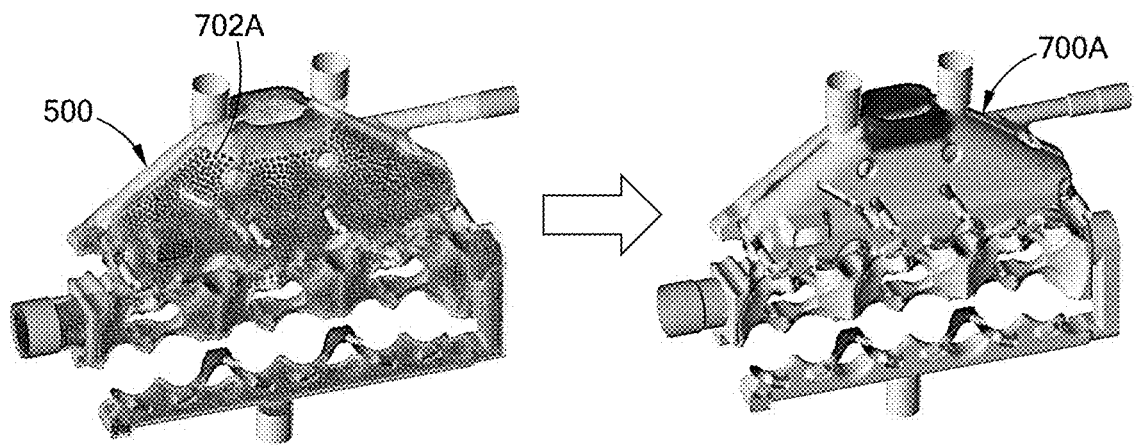
Figure 7B:
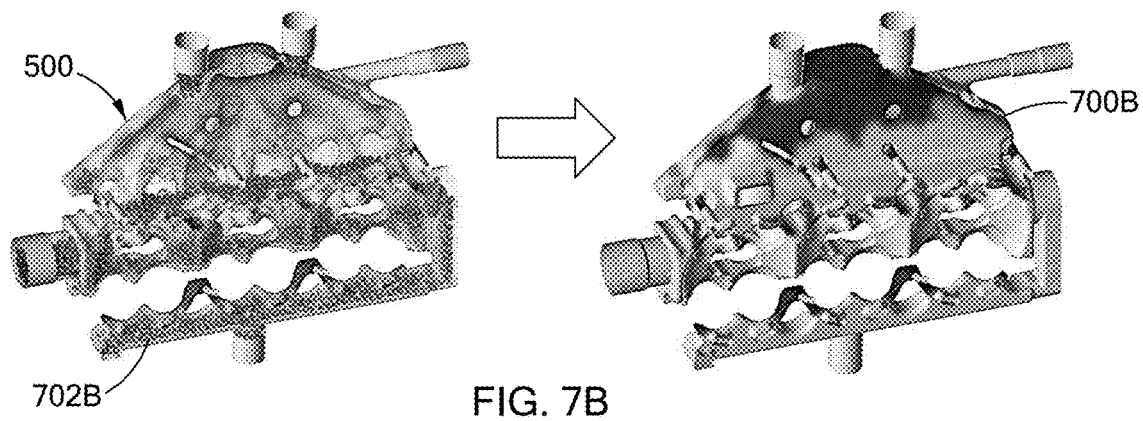
Figure 7C:
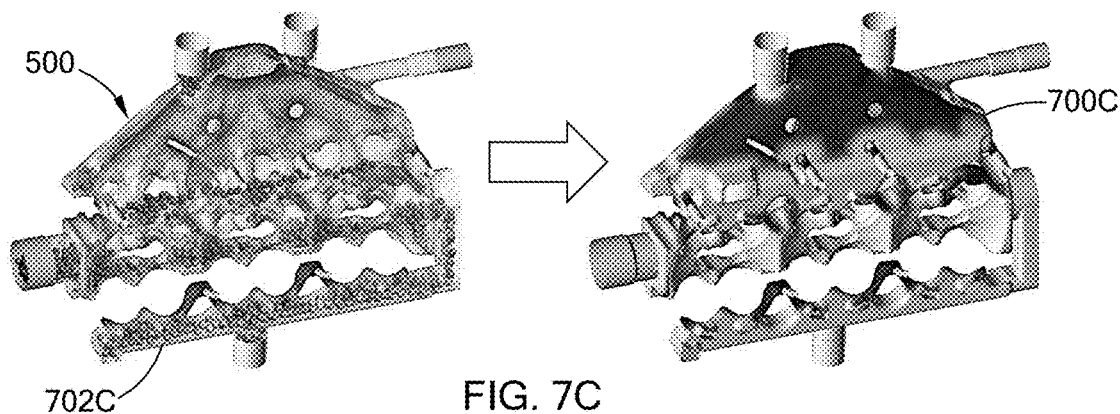
Figure 8A:
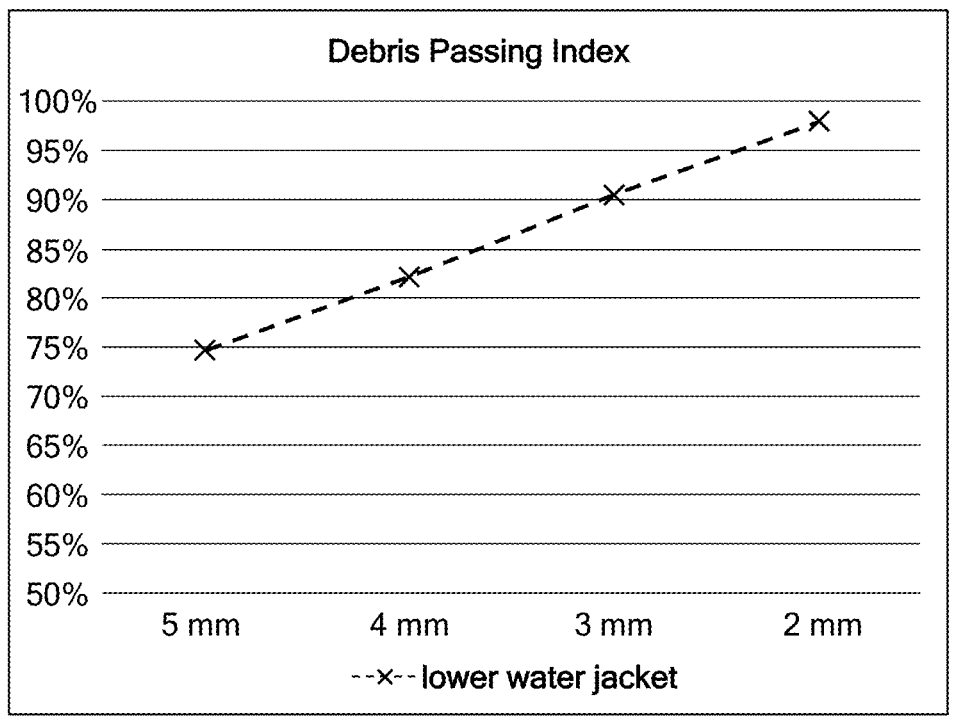
Figure 8B:
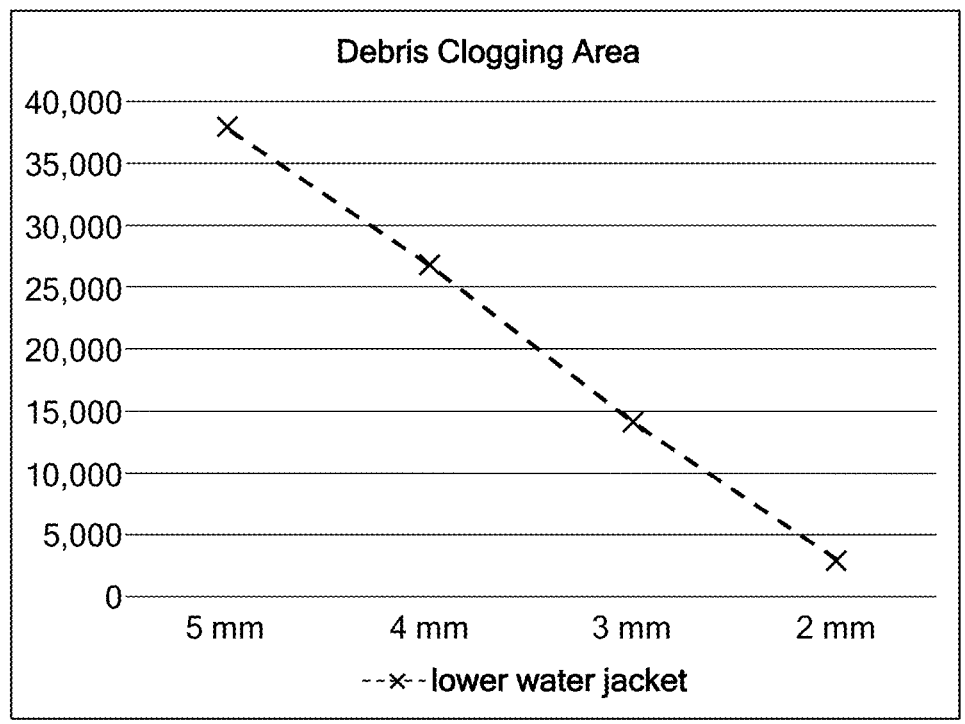
Figure 9A:
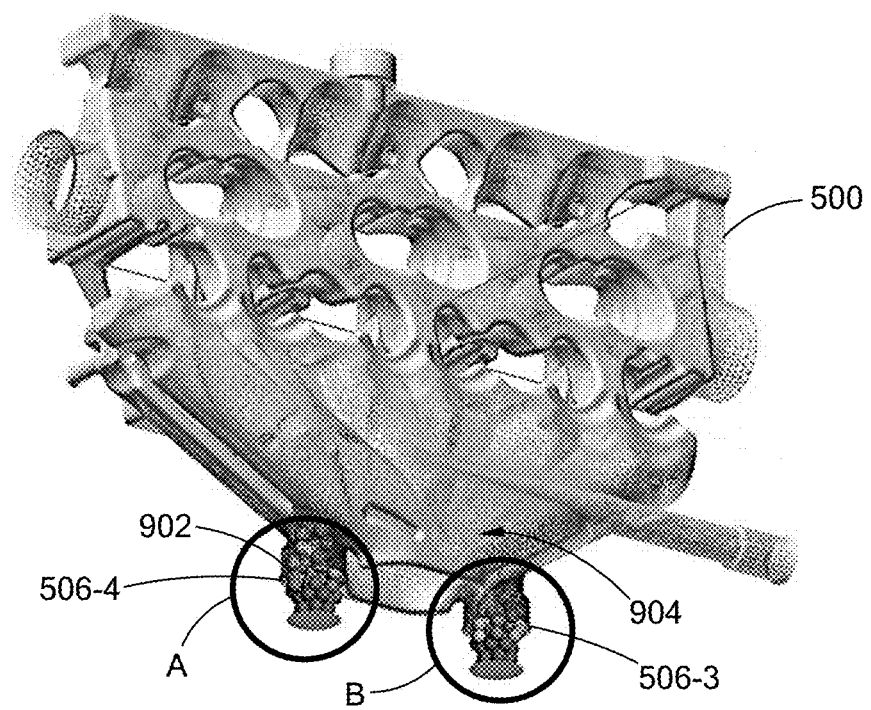
Figure 9B:
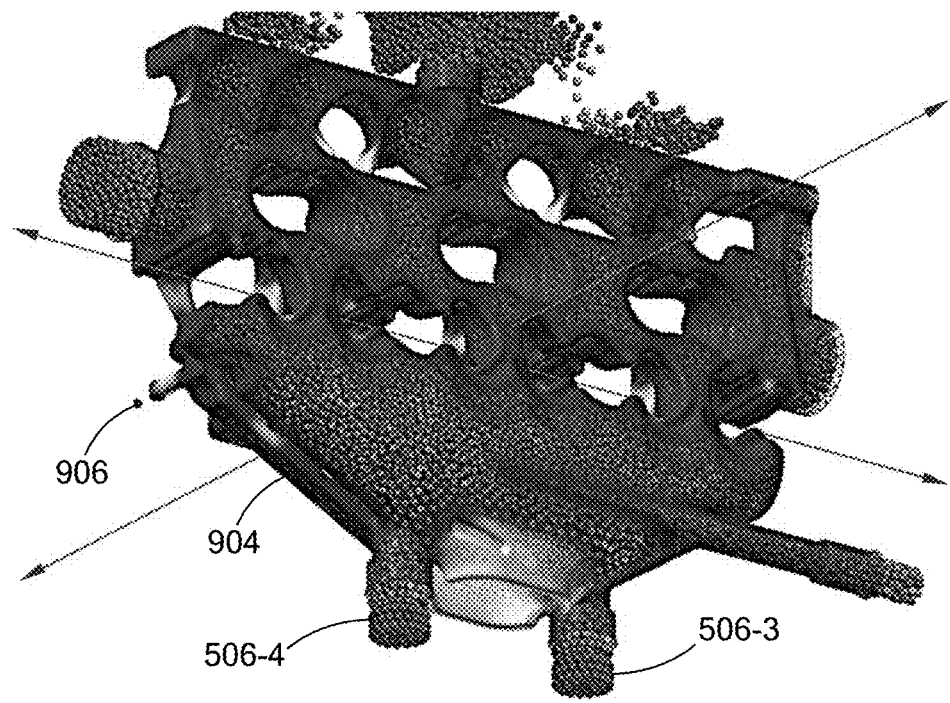
Figure 9C:
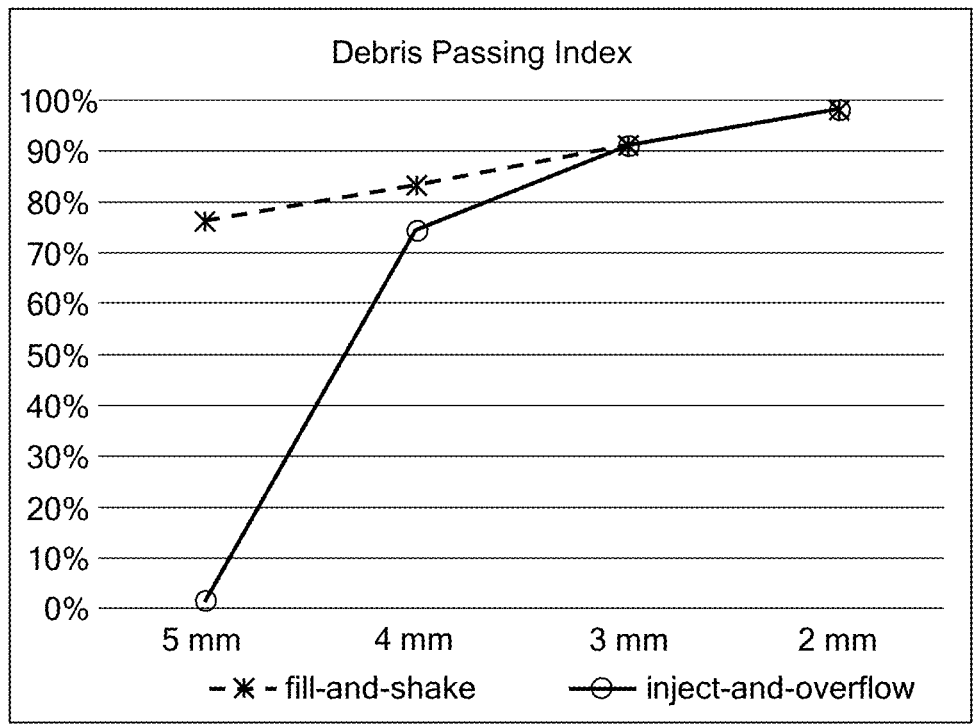
Figure 10:
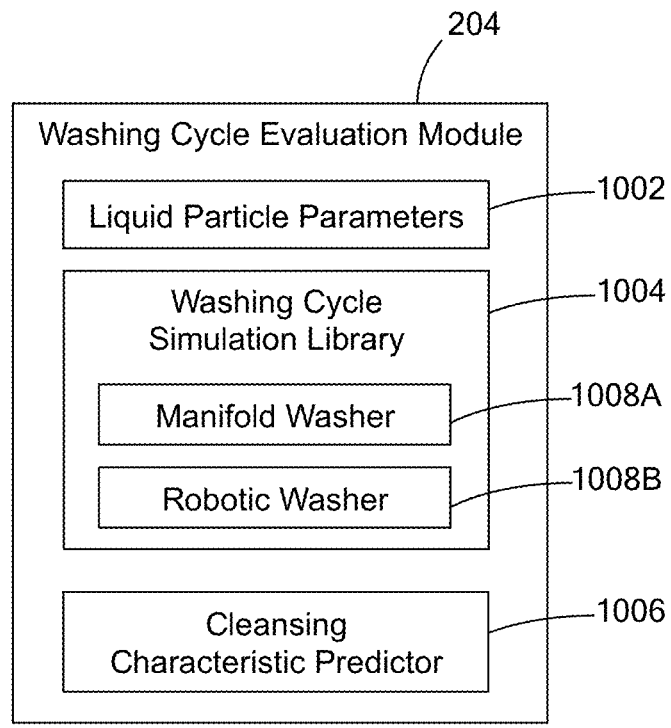
Figure 11A:
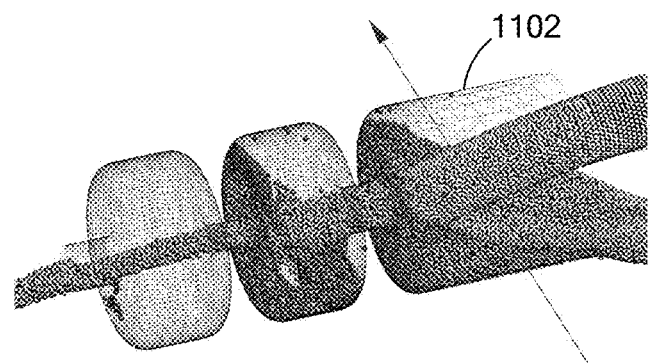
Figure 11B:
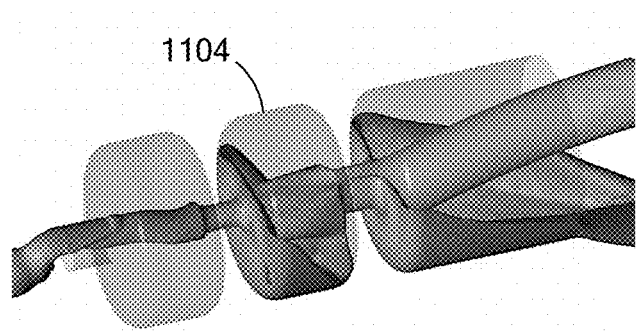
Figure 12:
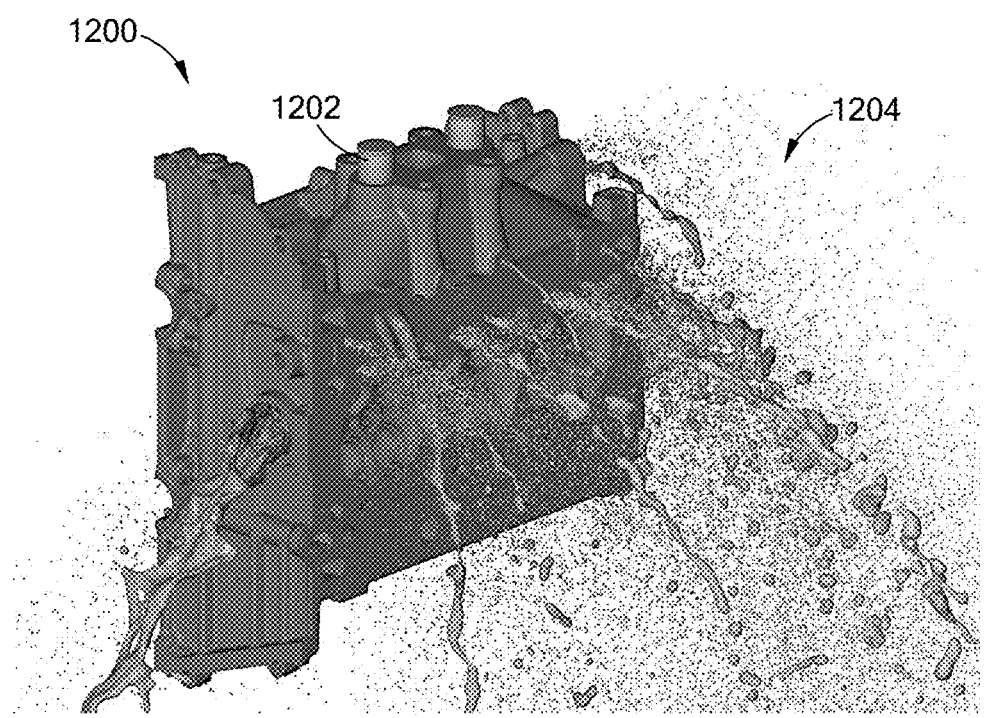
Figure 13A:
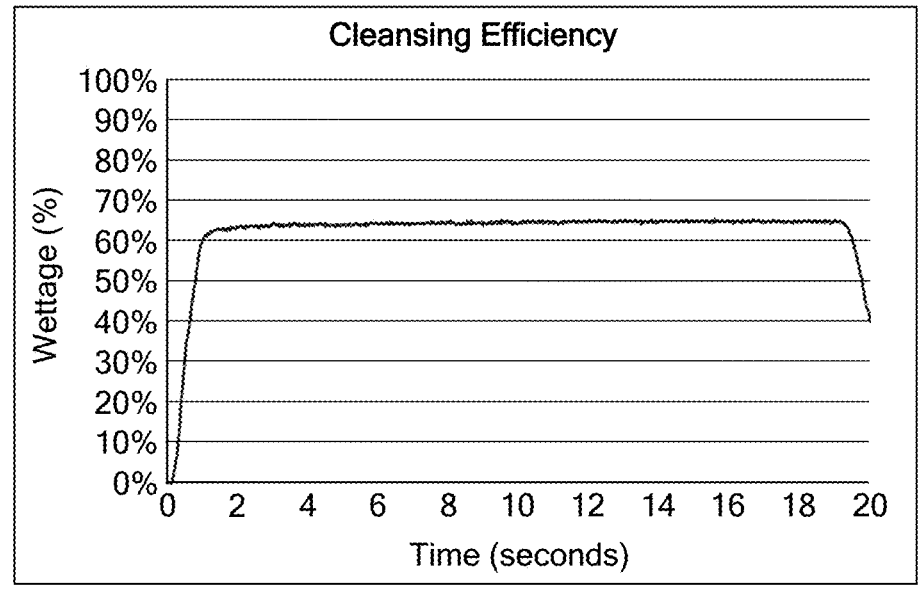
Figure 13B:
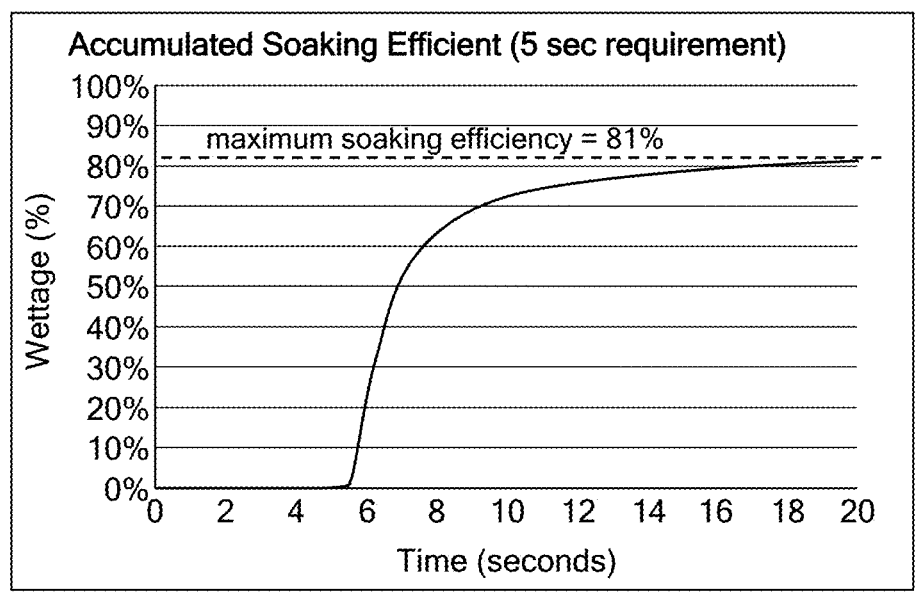
Figure 15:
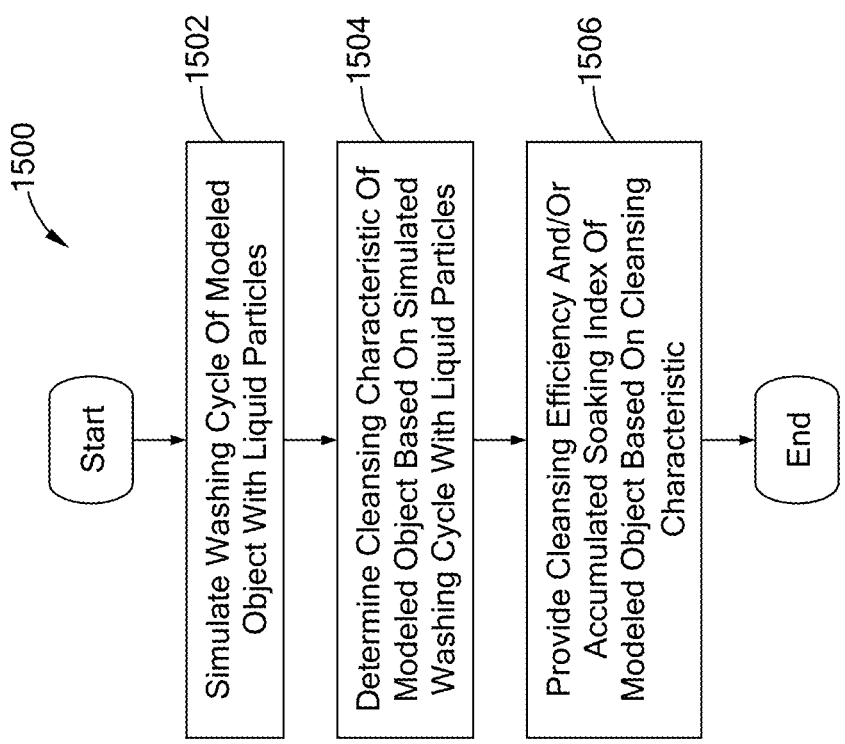
Figure 14:
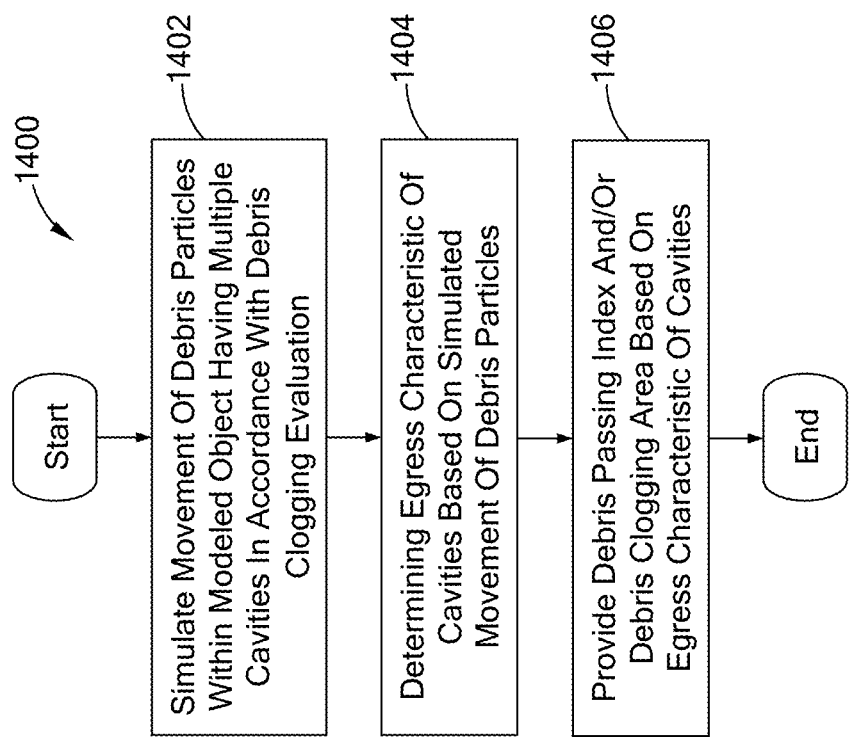

FIGS. 4A, 4B, and 4C illustrate a modeled object with debris particles of varying size in accordance with the present disclosure;

FIGS. 5A, 5B, and 5C illustrate a modeled object during a fill-shake evaluation in accordance with the present disclosure;

FIGS. 6A, 6B, and 6C illustrate the modeled object during an inject-overflow evaluation in accordance with the present disclosure;

FIGS. 7A, 7B, and 7C illustrate obstruction areas of the modeled object based on debris particles of varying parameters in accordance with the present disclosure;

FIGS. 8A and 8B are exemplary graphs of a debris passing index and debris clogging area, respectively, in accordance with the present disclosure;

FIGS. 9A, 9B and 9C illustrate a debris island condition and debris passing index based on the inject-overflow evaluation and a fill-shake evaluation in accordance with the present disclosure;

FIG. 10 is a block diagram of a washing cycle evaluation module of the VDCC simulator of FIG. 2 in accordance with the present disclosure;

FIGS. 11A and 11B illustrate a modeled object with liquid particles of varying size in accordance with the present disclosure;

FIG. 12 illustrates a manifold washing cycle of a modeled object in accordance with the present disclosure;

FIGS. 13A and 13B are exemplary graphs of a cleansing efficiency and an accumulated soaking index, respectively in accordance with the present disclosure;

FIG. 14 is a flowchart of a virtual clog simulation routine in accordance with the present disclosure; and FIG. 15 is a flowchart of a virtual cleanse simulation routine in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a method and/or an application tool for predicting egress characteristics for debris in an object and for developing a washing cycle for the object to remove potential debris particles within the object. More particularly, in one application, a machined object defines a network of chambers and channels of varying sizes and/or shapes, where the chambers are connected via the channels. The chambers, channels and other internal void are broadly referred to as cavities, herein. The network of cavities can inadvertently trap debris within and/or prevent the debris from being removed during a washing cycle. The present disclosure describes a virtual debris clog-cleanse (VDCC) simulator that simulates movement of debris inside a virtual model of the object to predict debris clogging location(s) and quantify potential clogs based on the predicted debris clogging locations. The VDCC simulator further simulates a washing cycle of the virtual model to determine cleansing characteristics and further define a nominal washing cycle for the object.

Figure 1:
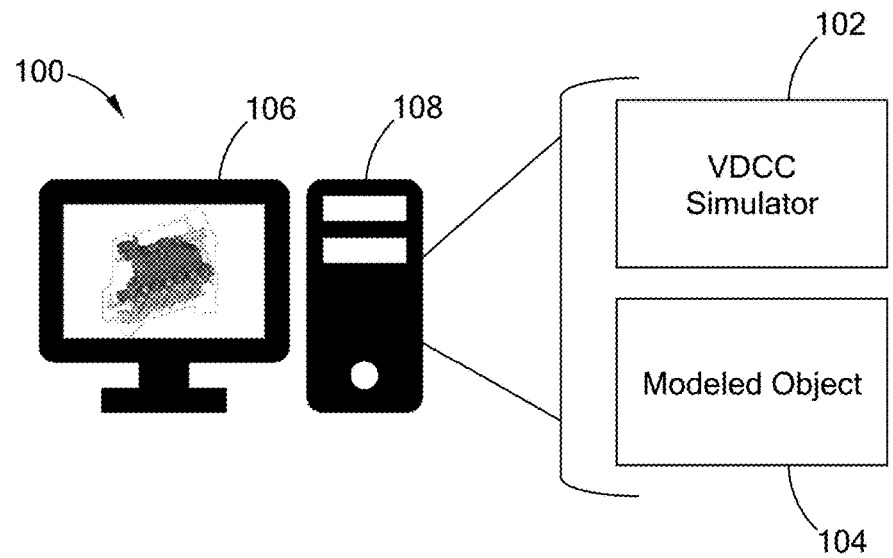
FIG. 1 illustrates a computing system having a virtual debris clog-cleanse (VDCC) simulator in accordance with the present disclosure.

Referring to FIG. 1, in one form, a computing system 100 is equipped with a VDCC simulator 102 of the present disclosure for evaluating a modeled object 104. Here, the computing system 100 includes a human machine interface (HMI) such as a touchscreen monitor 106 for exchanging information with a user, and a computer 108. In one form, the VDCC simulator 102 is provided as computer readable instructions that are stored and processed by the computer 108. It should be readily understood that the computing system 100 may include other suitable HMI(s) and should not be limited to the touchscreen monitor 106. In addition, while the VDCC 102 and the modeled object 104 are provided as being stored on the computer 108, the VDCC 102 and/or the modeled object 104 may be stored at a remote server that is accessible via the computing system and a communication network that communicably links the computing system to the remote server having the VDCC and/or modeled object.

In one form, the modeled object 104 is a multidimensional computer aided design model of an object that is to be produced by, for example, a machining process of a workpiece such as a casted part. In one form, the object defines one or more cavities and/or one or more chambers that are represented by the modeled object 104. In an exemplary application, the object may be a precision engine component such as a water jacket that includes a network of cavities of varying size. While specific examples are provided, the object and thus, the modeled object may be representative of other objects and should not be limited to the examples provided herein.

In one form, the VDCC simulator 102 is a smoothed particle hydrodynamics (SPH) based simulation software tool to assist in different engineering objectives based on particles having selectable parameters (e.g., size and/or shape). In one form, the VDCC simulator 102 is configured to identify potential debris clogging areas of the object by simulating movement of debris such as chips, within the cavities of the object. In this form, the particles employed by the VDCC simulator 102 are configured to have the same size as debris, so that the dynamic of a collection of the debris particles follow the laws of fluid dynamics. In other words, the VDCC simulator 102 defines the particles such that the particles move like liquid collectively and as debris individually. In another form, the particle is configured to be very small to evaluate a washing cycle for the object by simulating flow of a liquid, such as water, through the cavities. As described further below, parameters of the particles, such as size and/or shape, are adjustable based on the objective of the evaluation to be performed.

Referring to FIG. 2, the VDCC simulator 102 is configured to include a debris clogging evaluation (DCE) module 202 for predicting one or more egress characteristic and a washing cycle evaluation (WCE) module 204 for determining one or more cleansing characteristics. The DCE module 202 simulates movement of particles that are indicative of solid debris through the cavities of the modeled object (e.g., 3D water jacket model 206) to identify possible debris clogging locations and predict the egress characteristic. In real-world applications, the movement of debris within the object is random, and therefore, the DCE module 202 may employ one or more debris clogging evaluations that simulate different vibrational patterns to identify inaccessible areas along the cavities. The WCE module 204 simulates movement of particles that are indicative of a liquid substance through the cavities of the modeled object to define and evaluate effectiveness of a washing cycle for removing debris in the modeled object, and thus, the object. In the following, particles defined for the DCE module 202 may be referred to as debris particles and particles defined for the WCE module 204 may be referred to as liquid particles.

Figure 3:
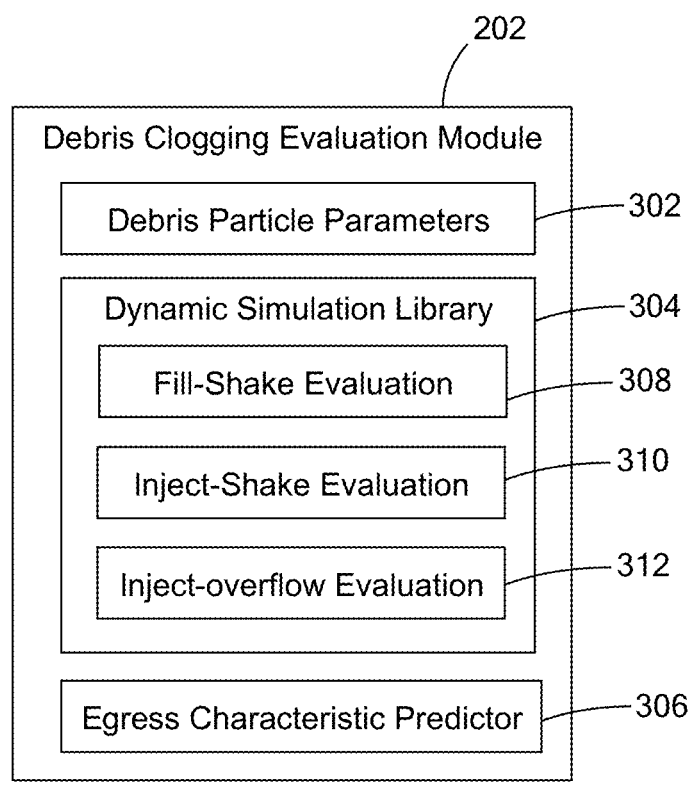
FIG. 3 is a block diagram of a debris clogging evaluation module of the VDCC simulator of FIG. 2.

Referring to FIG. 3, to predict the egress characteristics, the DCE module 202 is configured to have a debris particle parameter 302, a dynamic simulation library 304, and an egress characteristic predictor 306. The debris particle parameter 302 defines parameter(s) for the debris particles used for evaluating egress of the modeled object and may include shape, size, among others. For example, with reference to FIGS. 4A to 4C, a modeled object 402 contains debris particles having varying sizes to illustrate the relationship between particle size and assessing clog. The modeled object 402 defines three channels 404-1, 404-2, and 404-3 that have varying diameters and connect three chambers 405-1, 405-2, and 405-3. FIG. 4A illustrates debris particles 406A that have diameters of 6 mm and cause a clog at channel 404-1. FIG. 4B illustrates debris particles 406B that have diameters of 4 mm and while they pass channel 404-1 into chamber 405-2, the particles 406B cause a clog at channel 404-2. FIG. 4C illustrates debris particles 406C that have diameters of 2 mm and pass channels 404-1, 404-2, and 404-3 and chambers 405-1, 405-2, and 405-3, thereby indicating debris can move through a machined object indicative of the modeled object 402 if the size is less than or equal to 2 mm.

The shape of the particles may include but should not be limited to: sphere, cube, tetrahedron, cylinder, rectangular prism, pyramid, and/or triangular prism. The size of the particles is defined based on the shape selected. For example, if the shape is a sphere, a radius of the sphere can be selected. If the shape is a cylinder, the height and radius of the cylinder can be selected. In one form, the parameters of the particles may be determined based on the debris generated during the machining operation of the object. In one form, the debris particle parameter 302 may store predefined shape(s) and sizes for the debris particles that are selectable by the user. In another form, the debris particle parameter 302 may receive specific parameters defining the debris particles from the user allowing customizable configuration of the debris particle.

The dynamic simulation library 304 stores the debris clogging evaluation(s) to simulate different vibrational patterns. In one form, the debris clogging evaluation(s) include a fill-shake evaluation 308, an inject-shake evaluation 310, and inject-overflow evaluation 312. The fill-shake evaluation 308 is configured to identify clog prone areas of the modeled object in which debris particles may not be able to leave. Specifically, in one form, the fill-shake evaluation 308 simulates the modeled object in a filled state in which the debris particles are distributed throughout the cavities and conduits of the modeled object, which are ports to connect to other components, are sealed to contain the debris particles within the modeled object. The modeled object is then rotated about one or more axes to assess movement of the debris particles through the modeled object. For example, FIGS. 5A-5C illustrate a fill-shake evaluation in which a modeled object 500, which is provided as a water jacket for an engine, is filled with debris particles 502 (FIG. 5A). The modeled object 500 has series of cavities of varying dimensions (referred to as "cavity network 504") and includes multiple conduits 506 (506-1 to 506-12) that are sealed (FIG. 5B). Once filled, the modeled object 500 is rotated (i.e., shake simulation) causing the debris particles to move within the cavity network 504 of the modeled object (FIGS. 5B and 5C).

In one form, the inject-shake evaluation 310 is configured to simulate injection of the debris particles at a conduit of the modeled object to meet a fill criterion. Conduits of the modeled object are then sealed and the modeled object is rotated about one or more axes to assess movement of the debris particles through the modeled object. In one form, the fill criterion is a predetermined time period and/or a predefined volume. For example, when performing the inject-shake evaluation 310, the DCE module 202 injects the debris particles at one or more selected conduits for a predefined time period (e.g., 10 secs, 15 secs, among others) and/or when a defined volume of particles are injected. While specific fill criteria are provided, other fill criteria may be provided such as specific region of the modeled object, among others.

In one form, the inject-overflow evaluation 312 is configured to simulate injection of the debris particles at a first conduit of the modeled object until the debris particles exits a second conduit different from the first conduit. That is, the inject-overflow evaluation 312 designates at least one conduit as an entrance and at least one other conduit as an exit and continues to inject debris particles in the entrance until particles leave the exit. For example, FIGS. 6A, 6B, and 6C illustrate the modeled object 500 undergo an inject-overflow evaluation. In this example, debris particles 602 are injected via the conduit 506-1 and are to exit conduits 506-2, 506-3, and 506-4 with the remaining conduits 506 sealed. FIG. 6B illustrates approximately 50% of the modeled object 500 filled with the debris particles, and FIG. 6C illustrates an overflow state in which debris particles are overflowing through conduits 506-3 and 506-4.

While specific debris clogging evaluations are described, the dynamic simulation library 304 may include other evaluations, such as an isolated evaluation that evaluates egress at selected areas of the modeled object. It should be readily understood that multiple iterations of a selected debris clogging evaluations described herein may be performed for assessing movement of debris particles. For example, different iterations may simulate movements of debris particles having different sizes (e.g., a first iteration debris particle size is 3 mm and a second iteration debris particle size is 4 mm). In another example, different iterations of the inject-overflow evaluation or the inject-shake evaluations may identify different conduits through which debris particles are injected and those that are to be sealed and further in the case of the inject-overflow evaluation, are provided as exits.

For the one or more of the debris clogging evaluations, the egress characteristic predictor 306 determines one or more egress characteristics of the modeled object and thus, the object. In one form, the egress characteristic includes a contact area and/or an obstruction area. More particularly, a contact area(s) is identified as an area along the cavities at which one or more debris particles flow through and an obstruction area(s) is identified as an area along the cavities that is inaccessible by any of the debris particles. An inaccessible area of an object can prevent debris located within the inaccessible area of the cavity from exiting the object and thus, are suspectable to clogs. For example, FIGS. 7A to 7C illustrate debris particles within the modeled object 500 and provided an obstruction model 700 (700A, 700B, and 700C in figures) of the modeled object 500 that provides obstruction areas (in black) based on one or more debris clogging evaluation. FIG. 7A illustrates 3 mm sized debris particles 702A, FIG. 7B illustrates 4 mm sized debris particles 702B, and FIG. 7C illustrates 5 mm sized debris particles 702C. As illustrated, the bigger the debris particle, the more obstruction areas detected.

In one form, the egress characteristic predictor 306 is further configured to calculate a debris passing index and/or a debris clogging area based on the egress characteristic of the cavities. In one form, the debris passing index is a ratio of the contact area versus a total area of the modeled object. Specifically, the debris passing index indicates how easily debris of a defined size can pass. The debris passing index is provided in terms of percentage (%) with respect to debris particle size (mm). The lower the debris passing index, the higher the probability that debris will be trapped and thus, form clogs within the object. Conversely, the higher the debris passing index, the lower the probability that debris will be trapped within the object. In one form, the debris passing index is provided as a graph of debris passing index (%) vs size of the particles. For example, FIG. 8A illustrates a debris passing index based on results of one or more of the debris clogging evaluations that evaluate areas inaccessible of debris particles of varying sizes (e.g., 2 mm, 3 mm, 4 mm, and 5 mm). Here, the smaller the debris particle size, the more likely the debris particle will pass through the object.

In one form, the debris clogging area identifies the obstruction areas provided along the cavities and is evaluated in terms of area (e.g., $mm^2$) with respect to size of the particle (e.g., mm). High debris clogging areas indicate a higher risk of debris being clogged or trapped in the object and an increase in the size of the particle may also increase debris clogging areas. In one form, the debris clogging area is provided as a curve of obstruction area ($mm^2$) vs. particle size (mm). For example, FIG. 8B illustrates a debris clogging graph that provides the obstruction area for debris particles of varying sizes.

While the egress characteristic predictor 306 is described as performing specific calculations, the egress characteristic predictor 306 may be configured to perform other calculations for quantifying egress properties of the modeled object, and thus, the object. For example, in one form, based on the inject-overflow evaluation, the egress characteristic predictor 306 is configured to identify a debris clogging island condition in which debris particles cannot move beyond a cavity that has a smaller opening to a larger opening cavity. More particularly, FIG. 9A illustrates the modeled object 500 having debris particles 902 and a debris clogging island condition at the area provided within circles A and B. Here, the debris particles are provided in conduits 506-3 and 506-4 and are not able to transition to a chamber 904 because cavities linking conduits 506-3 and 506-4 to chamber 904 are smaller than the size of the particle 902. FIG. 9B illustrates the modeled object 500 with debris particles 906 that are smaller in size than that of debris particles 902 of FIG. 9A. As illustrated, the debris particles 906 are able to move to chamber 904 and thus, there are no debris island condition. By knowing potential debris island conditions, developers of the object may modify manufacturing operations to reduce or inhibit debris particles of certain size and/or define washing cycles for removing the particles. FIG. 9C provides a graph of a debris passing index for a fill-shake evaluation and an inject-overflow evaluation to illustrate the difference in the evaluations when assessing obstruction areas. Here, the fill-shake evaluation indicates about a 75% probability that a 5 mm particle will pass; however, due to the debris island condition, the inject-overflow evaluation provides about a 0% probability. Thus, the different debris clogging evaluations are designed to identify different clogging situations of the modeled object.

Referring to FIG. 10, in one form, to determine cleansing characteristics, the WCE module 204 is configured to have liquid particle parameters 1002, a washing cycle simulation library 1004, and a cleansing characteristic predictor 1006. The liquid particle parameters 1002 defines parameter(s) for the liquid particles used for evaluating a washing cycle and may include shape, size, among other parameters. In one form, the liquid particle parameters 1002 is configured in a similar manner as that of the debris particle parameters 302 to allow the user to select from among various shapes and/or sizes. To represent liquid, such as water, the size of the liquid particle is generally much less than that of the debris particle and in particular, the smaller the size of the liquid particle the more the liquid particles collectively behave as water. For example, FIGS. 11A and 11B illustrates a modeled object 1102 containing liquid particles having varying sizes. FIG. 11A illustrate 0.5 mm liquid particles and FIG. 11B illustrates even smaller particles that behave more like liquid than that of FIG. 11A.

The washing cycle simulation library 1004 stores one or more washing simulations that are indicative of actual washing operations to be employed for washing the object. In one form, the washing simulations may include a manifold washer 1008A and a robotic washer 1008B (collectively "washing simulations 1008"). When executed, the washing simulations provide a virtual simulation of a washing cycle being performed by a manifold or a robot of the modeled object such that the water is simulated by the liquid particles defined by the liquid particle parameter 1002. For example, FIG. 12 illustrates a manifold washer simulation 1200 of a modeled object 1202 by employing liquid particles, generally identified by reference number 1204, as water.

In one form, for a washing cycle using a manifold, the manifold washer simulation positions the modeled object within the manifold and injects liquid particles into selected conduits of the modeled object. The rate at which the liquid particles are injected may be indicative of the velocity at which water is injected by the manifold during an actual washing cycle of the object. In another form, for a washing cycle using a robot, the robotic washer simulation includes one or more injectors that are operable to inject liquid particles into the conduits at varying angles. For both types of simulations, the areas of the cavities accessible by the liquid particles can be identified and/or calculated.

More particularly, the cleansing characteristic predictor 1006 is configured to determine cleansing characteristic of the modeled object, and thus, the object. In one form, the cleansing characteristic includes identifying wet areas as areas along the cavities in which the liquid particles flow through and/or determining a cleansing time for performing the washing cycle to obtain the highest wet area. The cleansing characteristic predictor 1006 may further be configured to determine a cleansing efficiency to provide the amount of the wet area over time, and/or an accumulated soaking index to provide the cleansing time for the modeled object based on the cleansing characteristic. In one form, the cleansing efficiency is provided in terms of percentage (%) with respect to time (e.g., seconds) such that the higher the percentage, the more efficient the washing cycle. In one form, the accumulated soaking index evaluates the length of time an area of the cavity is soaked with water and provides the nominal washing time needed to clean the object. The accumulated soaking index may be provided in terms of percentage with respect to time such that the higher the percentage, the shorter the cycle time for the washing cycle. For example, FIG. 13A is a graph of a cleansing efficiency and FIG. 13B is a graph of an accumulated soaking index. The exemplary graph of FIG. 13B provides the percentage of the surface that can be cleansed when only 5 seconds is available for the washing cycle and based on the data, about 19% of the surface will not be cleansed regardless of the amount of time provided.

Based on the data from the DCE module and the WCE module, an object cleansing procedure and/or an object manufacturing procedure may be developed for reducing or inhibiting debris from being trapped within the object. For example, by identifying a possible the obstruction area of the object, the machining operation employed for forming the cavity having the obstruction may be redefined to allow egress, thereby preventing the obstruction area. In addition, by employing smoothed-particle hydrodynamic based simulation for both the DCE module and the WCE module, the VDCC simulator of the present disclosure simulates movement of debris and liquid particles like liquid collectively, but due to difference in size, as debris particles effectively represent solid debris like chips.

In some of the figures illustrating a 3D object, two or more orthogonal axes may be provided for illustration purposes.

Referring to FIG. 14, an example virtual clog simulation routine 1400 performed by the DCE module based on inputs from a user is provided. Using a selected modeled object that defines multiple cavities (i.e., cavity network) and defined debris particle parameters, the DCE module, 1402, at 1402, simulates movement of debris particles within the modeled object in accordance with one or more debris clogging evaluations to identify inaccessible areas along the cavities. More particular, a user may execute a virtual debris clogging evaluation of the modeled object to identify a potential debris clogging area of the modeled object. The virtual debris clogging evaluation includes a simulation of the debris particles moving through the modeled object. As provided more than one debris clogging evaluation may be performed and different iteration of single evaluation may also be performed.

At 1404, the DCE module determines one or more egress characteristic(s) of the modeled object, and specifically, the cavities, based on one or more of the simulated movements. More particularly, the DCE module predicts the egress characteristic of a machined object indicative of the selected modeled object based on the executed virtual debris clogging evaluation. In one form, the egress characteristic includes a contact area, an obstruction area, or a combination thereof. The contact area is provided as an area along the cavities at which one or more debris particles flows through and the obstruction area is identified as an area along the cavities that is inaccessible by the debris particles.

At 1406, the DCE module provides a debris passing index and/or a debris clogging area based on the egress characteristic(s) of the cavities. More particularly, the DCE module calculates a debris passing index and/or a debris clogging area based on the egress characteristic. In one form, the debris passing index is a ratio of the contact area versus a total area of the modeled object and the debris clogging area is an area provided along the cavities that is inaccessible by the debris particles.

Referring to FIG. 15, an example virtual cleanse simulation routine 1500 performed by the WCE module based on inputs from the user is provided. Using a selected modeled object that defines multiple cavities (i.e., cavity network) and defined liquid particle parameters, the WCE module, at 1502, simulate washing cycle of the modeled object with the liquid particles. More particular, the WCE module executes a virtual washing cycle evaluation of the selected modeled object to identify a cleansing characteristic of the modeled object. The virtual washing cycle evaluation is a simulation of the liquid particles flowing through the modeled object.

At 1504, the WCE module determines cleansing characteristic of the modeled object based on the simulated washing cycle with the liquid particles. In one form, the cleansing characteristic includes a wet area, a cleansing time, or a combination thereof. At 1506, the WCE module provides a cleansing efficiency and/or an accumulated soaking index of the modeled object based on cleansing characteristic. More particularly, the WCE module determines the cleansing efficiency to provide an amount of the wet area over time and/or the accumulated soaking index to provide a cleansing time for the modeled object. Based on the virtual washing cycle evaluation of the modeled object (e.g., the cleansing characteristic, the cleansing efficiency, and/or the accumulated soaking index), a washing cycle for the physical machined object may be defined by the user.

It should be readily understood that the routines 1400 and 1500 for the DCE module and the WCE module, respectively, may be suitable in other suitable ways and should not be limited to the routines provided. In addition, while the VDCC simulator is provided as both DCE module and WCE module, the VDCC simulator may only include the DCE module or the WCE module. In yet another variation, the DCE module and the WCE module may be stored at separate at different locations from one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer

What is claimed is:

1. A method comprising:
    simulating movement of a plurality of debris particles provided within a modeled object having a plurality of cavities in accordance with a debris clogging evaluation to identify an inaccessible area along the plurality of cavities, wherein the inaccessible areas is an area at which one or more debris particles are inhibited from leaving, wherein the plurality of debris particles is indicative of solid debris and the modeled object is a multidimensional computer designed model;
    determining an egress characteristic of the plurality of cavities based on the simulated movement of the plurality of debris particles, wherein the egress characteristic includes a contact area, an obstruction area, or a combination thereof; and
    calculating a debris passing index, a debris clogging area, or a combination thereof based on the egress characteristic of the plurality of cavities,
    wherein the debris passing index is a ratio of the contact area versus a total area of the modeled object and the debris clogging area is the inaccessible area provided along the plurality of cavities.

2. The method of claim 1 further comprising defining an object cleansing procedure, an object manufacturing procedure, or a combination thereof based on the egress characteristic.

3. The method of claim 1 the method further comprising:
    identifying, as the contact area, an area along the plurality of cavities at which one or more debris particles from among the plurality of debris particles flows through; and
    identifying, as the obstruction area, the inaccessible area along the plurality of cavities.

4. The method of claim 1, wherein the debris clogging evaluation includes a fill-shake evaluation, and for the fill-shake evaluation, the method further comprises:
    simulating the modeled object in a filled state in which the plurality of debris particles is distributed throughout the plurality of cavities; and
    rotating the modeled object about an axis to assess movement of the plurality of debris particles through the modeled object.

5. The method of claim 1, wherein the debris clogging evaluation is an inject-overflow evaluation, and for the inject-overflow evaluation, the method further comprises simulating injection of the plurality of debris particles at a first opening of the modeled object until the plurality of debris particles exits a second opening different from the first opening.

6. The method of claim 1, wherein the debris clogging evaluation includes an inject-shake evaluation, and for the inject-shake evaluation, the method further comprises:

simulating injection of the plurality of debris particles at an opening of the modeled object to meet a fill criterion; and rotating the modeled object about an axis to assess movement of the plurality of debris particles through the modeled object.

7. The method of claim 6, wherein the fill criterion is at least one of predetermined time period and a predefined volume.

8. The method of claim 1, wherein simulating movement of the plurality of debris particles is based on smoothed-particle hydrodynamic.

9. The method of claim 1 further comprising:

simulating a washing cycle of the modeled object in which a plurality of liquid particles flow through the plurality of cavities, wherein the liquid particles are indicative of a liquid substance; and determining a cleansing characteristic of the modeled object, wherein the cleansing characteristic includes a wet area, a cleansing time, or a combination thereof.

10. The method of claim 9 further comprising determining a cleansing efficiency to provide an amount of the wet area over time, an accumulated soaking index to provide a cleansing time for the modeled object, or a combination thereof based on the cleansing characteristic, wherein the cleansing efficiency is based on the wet area.

11. The method of claim 9, wherein a debris particle from among the plurality of debris particles has a defined particle size that is greater than that of a liquid particle from among the plurality of liquid particles.

12. A method comprising:

executing a virtual debris clogging evaluation of a modeled object having a plurality of cavities to identify a potential debris clogging area of the modeled object, wherein the virtual debris clogging evaluation includes a simulation of a plurality of particles moving through the modeled object, wherein for the virtual debris clogging evaluation, the plurality of particles is defined at a first size;

predicting an egress characteristic of a physical object configured as the modeled object having the plurality of cavities based on the executed virtual debris clogging evaluation;

executing a virtual washing cycle evaluation of the modeled object to identify a cleansing characteristic of the modeled object, wherein the virtual washing cycle evaluation is a simulation of the plurality of particles flowing through the modeled object, wherein for the virtual washing cycle evaluation, the plurality of particles is defined at a second size less than the first size; and defining a washing cycle for the physical object based on the virtual washing cycle evaluation of the modeled object.

13. The method of claim 12, wherein the virtual debris clogging evaluation and the virtual washing cycle evaluation are based on smoothed-particle hydrodynamic.

14. The method of claim 12, wherein for the virtual debris clogging evaluation, the plurality of particles is indicative of solid debris and for the virtual washing cycle evaluation, the plurality of particles is indicative of liquid.

15. A non-transitory computer readable medium storing program instructions, that when executed by a processor of computing device, cause the computing device to perform a set of operations comprising:

simulating movement of a plurality of debris particles provided within a modeled object having a plurality of cavities in accordance with a debris clogging evaluation to identify an inaccessible area along the plurality of cavities, wherein the inaccessible area is an area at which one or more debris particles are inhibited from leaving, wherein the plurality of debris particles is indicative of solid debris and the modeled object is a multidimensional computer designed model;

determining an egress characteristic of the plurality of cavities based on the simulated movement of the plurality of debris particles, wherein the egress characteristic includes a contact area, an obstruction area, or a combination thereof;

simulating a washing cycle of the modeled object in which a plurality of liquid particles flow through the plurality of cavities, wherein the liquid particles are indicative of a liquid substance;

determining a cleansing characteristic of the modeled object, wherein the cleansing characteristic includes a wet area, a cleansing time, or a combination thereof; and determining a cleansing efficiency to provide an amount of the wet area over time, an accumulated soaking index to provide a cleansing time for the modeled object, or a combination thereof based on the cleansing characteristic, wherein the cleansing efficiency is based on the wet area.

16. The non-transitory computer readable medium of claim 15, wherein the set of operations further comprises: calculating a debris passing index, a debris clogging area, or a combination thereof based on the egress characteristic of the plurality of cavities, wherein the debris passing index is a ratio of the contact area versus a total area of the modeled object and the debris clogging area is the inaccessible area provided along the plurality of cavities.

* * * * *